UNITED STATES PATENT OFFICE 2,416,022

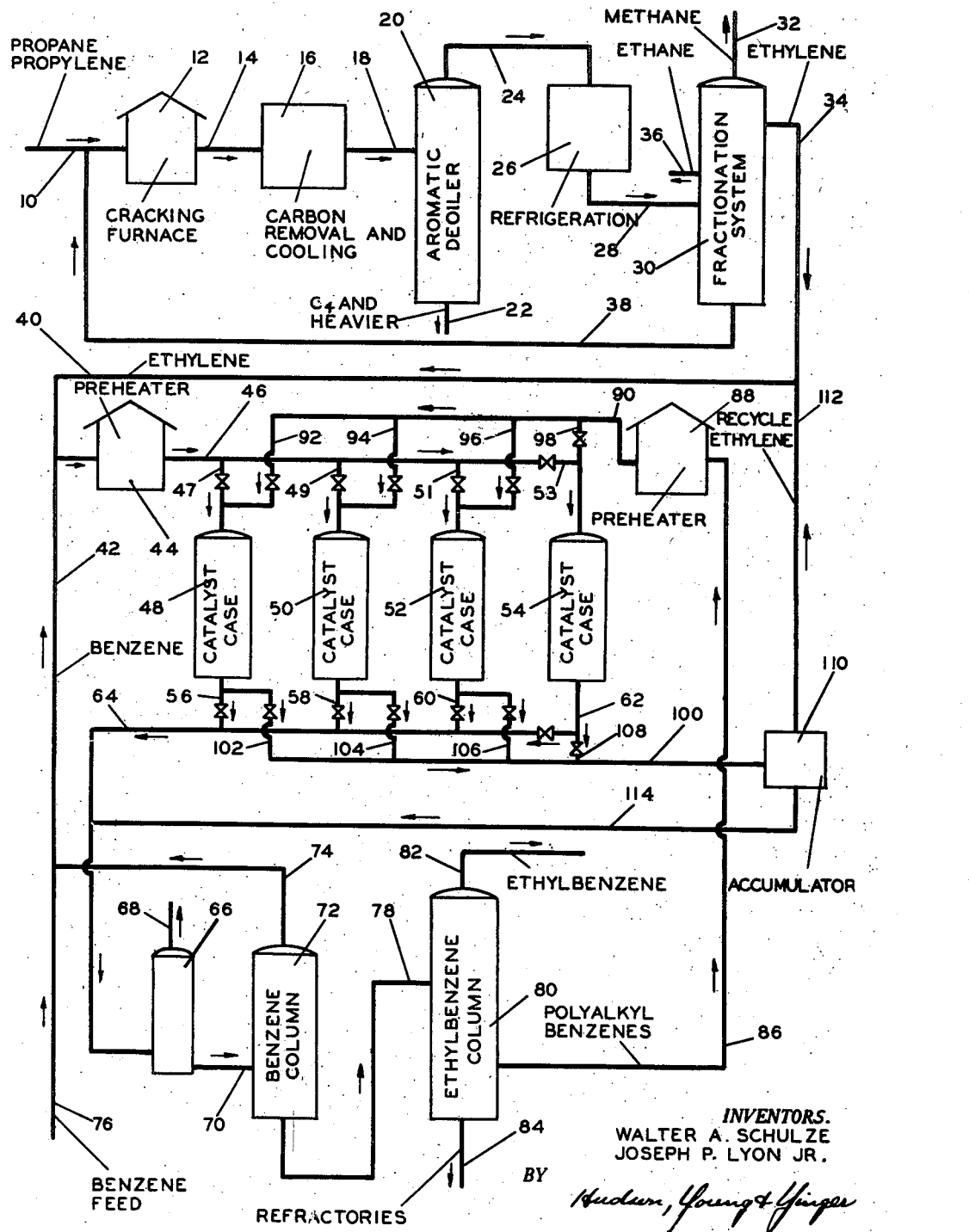

ALKYLATION PROCESS

Walter A. Schulze, Bartlesville, Okla., and Joseph P. Lyon, Jr., Phillips, Tex., assignors to Phillips Petroleum Company, a corporation of Delaware Application March 20, 1943, Serial No. 479,932

9 Claims. (Cl. 260—671)

This invention relates to the synthesis of alkyl-substituted benzenes and benzene homologs by catalytic condensation of benzene or benzene homologs with aliphatic alkylating agents in the presence of solid contact catalysts. More specifically, this invention relates to an improved catalytic process for the alkylation of aromatic hydrocarbons with aliphatic olefins to produce mono-alkylated derivatives in improved yields and purity. In a particular embodiment the invention relates to the catalytic cracking of poly-alkyl benzenes to give increased yelds of mono-alkyl benzenes in the process.

It is an object of this invention to provide an improved process for the alkylation of aromatic hydrocarbons with alkylating agents, such as olefins. Another object of this invention is to provide an improved process for the alkylation of benzene with olefins in which a novel type of solid alkylation catalyst is employed. A still further object of this invention is to provide an improved process for the synthesis of alkylbenzenes wherein an efficient degree of olefin utilization is accomplished without incurring excessive product losses in the form of poly-alkylbenzenes. Yet another object is the improved process for the conversion by poly-alkylbenzenes to mono-alkyl-benzenes which consists of treating the poly-alkylbenzene over solid contact catalysts previously employed in benzene-olefin alkylation step. Further objects and advantages obtained when employing our improved alkylation process will be apparent from the disclosure given hereinafter.

The alkylation of aromatic hydrocarbons wherein side chains become attached to the aromatic nucleus may be effected in the presence of a variety of alkylation catalysts, and with alkylating agents in various forms such as alkyl halides, alcohols and olefins to give special and valuable hydrocarbons.

In the alkylation of benzene with olefins or compounds yielding olefins, a succession of reactions may take place whereby the alkylated products comprise a mixture of mono-, di-, tri-, and higher alkyl compounds, up to the limit of substitutable hydrogen atoms of the benzene nucleus. Apparently, the introduction of the original alkyl group activates the nucleus for further substitution, so that the mono-alkylbenzenes are subject to further alkylation to an extent dependent on the catalyst, the olefin alkylating agent, and the reaction conditions. Since the poly-alkylbenzenes are often relatively unsatisfactory products for utilization in various processes or compositions, for example, aviation gasoline, their formation represents a loss of valuable raw materials and decreased yield from the alkylation process.

In our copending application, Serial No. 460,847, filed October 5, 1942, now Patent 2,395,199, granted February 19, 1946, of which this application is a continuation-in-part, we have described a process for the production of mono-alkylbenzenes particularly ethylbenzene, wherein the poly-alkylated products resulting from the benzene-olefin condensation are separated and converted by catalytic cracking into the desired mono-alkyl derivatives. In the alkylation step, particularly when employing the lower molecular weight olefins, e. g. ethylene and propylene, certain synthetic gel-type solid contact catalysts comprising silica gel activated with minor proportions of alumina and/or certain other metal oxides are disclosed as particularly effective.

We have now discovered that when solid contact catalysts, such as those described above, become spent, that is no longer efficient, for the alkylation reaction, they may be still quite effective in catalyzing the cracking of said poly-alkyl benzenes. Thus, important economies and improved process efficiency and operation result when the spent catalysts from the alkylation step are utilized as catalysts in the catalytic cracking step whereby poly-alkylated products are converted to the corresponding mono-alkyl-benzenes. In this improved operation, the catalyst after utilization in alkylating service to a predetermined limit of activity or conversion, is next employed as catalyst for the cracking of the heavy alkylate. In this manner, catalyst costs for the process are greatly reduced and greater efficiency in operation may be obtained by use of the same catalyst vessels if desired for both alkylation and cracking service.

In one specific embodiment, the process of the invention comprises the following steps: (1) reacting benzene with an olefin in the presence of a gel-type silica-alumina catalyst; (2) stripping reaction products from the alkylation step to remove unreacted light gases; (3) fractionally distilling liquid alkylation products to remove unreacted benzene; (4) further fractionating the alkylate to separate mono-alkylbenzene from higher-boiling alkylate; (5) treating the higher-boiling alkylate at cracking temperatures over the spent alkylation catalyst to obtain partial conversion to light gases comprising ethylene and a liquid fraction comprising benzene, mono-alkylbenzene and any unconverted heavy alkylate; (6) passing the liquid products from the cracking step into the stream of liquid products from the alkylation step to recover the alkylbenzene.

While the operation of the process may be considered in two stages or steps, the alkylation step and the cracking step, it is to be understood that the two steps may preferably comprise a continuous and integrated operation with the same fractionation equipment being utilized to handle the products from both catalytic conversions. The following detailed description of the process as applied to the synthesis of ethylbenzene will serve to illustrate the various operations involved.

An ethylene-containing stream, either substantially pure ethylene or a $C_2$ hydrocarbon mixture, is admixed with a stream of benzene in the desired molar proportions prior to or immediately after entering the catalyst chamber. The benzene-ethylene mixture passing through the bed of solid silica-alumina catalyst at proper pressure and temperature conditions undergoes alkylation producing ethylbenzene and small amounts of di- and tri-ethylbenzenes.

The solid adsorbent catalysts which are preferably used as a feature of the process are most accurately described as dried gels, characterized by their method of preparation, physical properties and chemical composition, all of which impart particular catalytic activity.

The preferred catalysts are usually prepared by first forming a hydrous silica gel or jelly from an alkali silicate and an acid, washing soluble material from the gel, treating or activating the gel with an aqueous solution of a suitable metal salt, and subsequently washing and drying the treated material. In this manner, a part of the metal, presumably in the form of a hydrous oxide or hydroxide formed by hydrolysis, is selectively adsorbed by the hydrous silica, and is not removed by subsequent washing. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a similar nature but differing among themselves as to one or more specific properties, may be prepared by using a hydrolyzable salt of a metal usually selected from groups IVA and/or IIIB of the periodic system. As listed in "Modern Inorganic Chemistry" by J. W. Mellor (Longmans, Green & Co. (1939), Revised and Edited by G. D. Parkers) on page 118, group IIIB consists of boron, aluminum, gallium, indium, and thallium, and group IVA consists of titanium, zirconium, hafnium, and thorium. More particularly a salt of aluminum, gallium, indium or thallium from group IIIB or a salt of titanium, zirconium or thorium in group IVA may be used to treat silica gel to prepare catalysts of this general type. These catalyst compositions contain a major portion of silica, and minor portion of promoting metal oxides, and are sometimes termed silica-alumina type catalysts. The minor portion of metal oxide, such as alumina, will generally not be in excess of 10 per cent by weight, and will more often, and generally more preferably, be between about 0.5 and 5 per cent by weight.

Modifications may be made in the foregoing procedure and catalysts of suitable activity may result. One obvious alternative is the addition of the metal salt to the silicate before gelation. This method enables the incorporation of greater proportions of metal oxide, but activity may not be proportional to increasing metal oxide contents above about 1 to about 15 weight per cent so that little is gained by the modification and the proper degree of salt and acid removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

Although the above-described synthetic catalysts are preferred in practicing our invention, other solid contact catalysts may be utilized, particularly other silica-alumina type catalysts which are prepared from naturally-occurring minerals such as zeolites and clays by acid treatment to remove ferrous impurities and the like and to adjust the silica-alumina ratio, although such preparations are usually less active, particularly in the alkylation step, than the preferred synthetic gels, and require higher cracking temperatures.

The preferred catalysts of this invention are of such nature that it is possible to employ them for long periods under the conditions selected for the alkylation reaction with a very gradual decline in activity. When this decline in activity makes continued service for alkylation undesirable, the catalyst retains suitable activity for the catalytic cracking reaction under conditions which are usually somewhat different from those required for alkylation. In many cases the activity and life of the catalyst in the catalytic cracking step are relatively independent of the length of the period during which the catalyst was employed for alkylation.

In the practice of our invention, the ethylbenzene and heavier alkylate are stripped of the light gases and the alkylate stream may be fractionated to recover the benzene which is recycled to the alkylation step. The light gases may or may not be recycled, depending upon the ethylene content. The liquid alkylate comprising principally ethylbenzene and diethylbenzenes is fractionated to recover the ethylbenzene. The heavier alkylate is vaporized and heated to cracking temperatures. A diluent such as steam, nitrogen, $CO_2$, methane, etc., may be added before and/or after the heating step. The heated vapors then pass through a cracking zone containing spent alkylation catalyst. Products from the cracking zone comprise ethylbenzene, benzene and ethylene and light gases. The products are preferably added to the alkylate stream and fractionated in the same equipment and the unconverted heavy alkylate recycled to the catalytic cracking step for further conversion to ethylbenzene.

Catalyst life in the alkylation step of the present process is ordinarily very long, since the relatively low temperatures and preferred-liquid phase operation both tend to prevent the accumulation of tarry poisons and carbonaceous deposits. Thus several hundred volumes of alkylate may often be produced per volume of catalyst before any significant change in activity is evident. The catalyst is not used in the alkylation reaction after the conversion declines seriously and/or excessive temperatures are required to maintain the alkylation rate. However, we have found that the activity of the spent alkylation catalyst is superior to many other catalysts for cracking operations in the second step of the present process. Thus, when the catalyst becomes spent for alkylation reactions, it may be used effectively in the cracking step by operating at usually higher temperatures and other conditions chosen to favor the cracking reaction.

The spent alkylation catalyst may be used in the catalytic cracking step immediately after being removed from alkylation service. In a preferred embodiment a sufficient number of catalyst chambers is provided to enable continuous alkylation while a chamber containing catalyst spent for the alkylation reaction is employed to convert the heavy alkylate previously and/or concurrently produced. In this manner, transferring of the catalyst may be avoided. Since the volume of heavy alkylate to be handled is ordinarily relatively small compared to the volume of mono-alkylate, one catalyst chamber in cracking service may be sufficient to process the heavy alkylate produced in one or more alkylation chambers over a relatively long period. Mobile catalyst systems, such as one employing a moving bed of granular catalyst, or one employing powdered catalyst at least partially suspended in reactants, may be used, with suitable modification.

The catalyst to be used in the cracking step is ordinarily put in service without intermediate treatment and employed as long as satisfactory conversion is obtained. However, it has been noted that reactivation treatment, such as the burning off of carbonaceous deposits may be utilized prior to or after use in the cracking step without impairing the activity of the catalyst for the cracking reaction. The economics of such conventional reactivation procedures may depend on the rate at which catalyst becomes available from the alkylation step as well as the length of the period of satisfactory activity in the cracking step. As mentioned above, since the relative volume of heavy alkylate is small, the alkylation step may furnish sufficient spent catalyst to supply the requirements of the cracking step. Catalyst which has been exposed to high temperatures in the cracking step or in subsequent reactivation is not usually suitable for further service in the alkylation reaction.

Temperatures for the alkylation step are ordinarily in the range of 200–700° F. with a somewhat narrower range of 450–650° F. ordinarily preferred for alkylation with ethylene. When higher olefins such as propylene are utilized, somewhat lower temperatures, e. g., 250–450° F. are ordinarily preferred. Within these limits, specific temperatures within the catalyst bed are chosen to conform to the catalyst activity and the composition of the feed to give the most efficient conversion at the operating pressure and moderate flow rates, of about 1 to 5 liquid volumes of feed per volume of catalyst per hour. In some cases with extremely reactive catalysts, low benzene-olefin mol ratios, and longer contact times, the lower temperatures may be adequate.

Operating pressures used in the alkylation reaction are chosen in accordance with the reaction requirements but are somewhat dependent upon the temperature. For example, pressures in the range of 100 to 2000 pounds per square inch gage are employed in the alkylation reaction, which is apparently promoted to some extent by pressure. Thus, increased pressures tend to promote conversion and enable rapid reaction rates at somewhat lower temperatures and/or shorter contact times.

In the second or catalytic cracking step, temperatures are much higher than those of the corresponding alkylation step, and are usually in the range of about 700 to about 1100° F. Preferred temperatures for the cracking of heavy alkylate from benzene-ethylene alkylation over spent alkylation catalyst are from about 950 to about 1100° F. In the case of poly alkylated products from alkylation with higher olefins such as propylene, the preferred cracking temperatures may range from about 700 to about 900° F.

Pressures in the cracking step are usually maintained at low values to favor the cracking reaction and suppress undesirable side reactions. In most cases, low superatmospheric pressures of about zero to about 100 pounds gage are satisfactory to sustain the flow of vapors through the catalyst chamber and auxiliary equipment.

It is often desirable to include a substantially inert diluent in the feed to the cracking step to serve as a heat carrier and to suppress carbon deposition and destructive side reactions. For this purpose steam is ordinarily preferred, although refractory hydrocarbon gases, and other gases such as nitrogen, carbon dioxide, etc. may be utilized.

The feed stocks for the above-described process may be derived from any suitable source, such as petroleum refining processes which produce both aromatic and olefin hydrocarbons, or from unrelated sources when process economics are favorable. We have found the process well adapted for utilizing ethylene from refinery gas streams which ordinarily contain very small amounts of gases other than ethane and ethylene. When used as a selective chemical synthesis, it is advantageous to employ relatively pure benzene and olefin, or an olefin feed stock containing a single reactive component such as a mixture with the corresponding paraffin. The use of relatively pure benzene also results in longer catalyst life and purer products since the production of compounds of such boiling range as to contaminate the alkylate is avoided.

While the foregoing disclosure has been relatively specific to the production of ethylbenzene from benzene and ethylene, it may be adopted with suitable modifications to processes utilizing higher olefins which can be successfully alkylated over solid catalysts of the type described. Thus, the adoption to the production of cumene involves the use of catalyst spent in the benzene-propylene alkylation to catalytically crack the heavy alkylate and produce further quantities of cumene. Furthermore, heavy alkylate resulting from alkylation reactions in the presence of other types of alkylation catalysts may be treated by the process along with heavy alkylate produced over the original solid type catalyst.

These and other modifications will be obvious from the disclosure and the following examples which illustrate specific applications of the process. These examples, however, are not to be construed as undue limitations upon the scope of the invention.

*Example I*

The catalyst used in the following example was prepared by the steps of (1) forming silica hydrogel by introducing sodium silicate solution into excess sulfuric acid; (2) washing and partially drying the gel to a $SiO_2:H_2O$ mol ratio between 1:1 and 2:1; (3) activating the partially dried gel by boiling in a solution of iron-free aluminum sulfate; (4) washing the activated gel to remove free acid and salts, and finally drying to form hard, glassy granules. This catalyst was used in 12 to 20 mesh sizes.

A benzene-ethylene feed was premixed in a molar ratio of 3.7:1 and this mixture passed over the catalyst at 520–570° F. and 1000 pounds gage pressure. The feed rate was 1.5 liquid volumes of charge per volume of catalyst per hour.

The products of alkylation were stripped of light gases and the liquid alkylation products were successively fractionated to remove untreated benzene, and to separate ethylbenzene from diethylbenzene and higher substituted homologs. The alkylate consisted of 84.6 weight per cent of ethylbenzene and 15.4 weight per cent of heavy alkylate, principally diethylbenzene. The ethylbenzene was recovered substantially pure, and the heavy alkylate was passed to the catalytic cracking step.

The heavy alkylate charge admixed with steam in a steam-hydrocarbon mol ratio of 3.8:1 was passed at 995° F. and 4 pounds gage pressure through a catalyst chamber containing spent catalyst from the alkylation reaction. The hydrocarbon flow rate was 1 liquid volume per volume of catalyst per hour. The effluent products were cooled to condense the liquid components and water, with the latter separated prior to fractionation. Light gases containing about 90 mol per cent ethylene were removed from the condensed hydrocarbons, and recycled to the alkylation step.

The liquid hydrocarbon products from the cracking step were added to the stream of liquid alkylation reaction products to effect separation into benzene, ethylbenzene and unconverted diethylbenzene. The per pass conversion was 25–30 weight per cent of the heavy alkylate charged and product analysis showed that each 100 mols of converted heavy alkylate produced about 10 mols of benzene and 85 mols of ethylbenzene.

*Example II*

Silica-alumina catalyst which had been used to alkylate benzene with propylene at 350° F. and 400 pounds gage pressure was used as cracking catalyst after production of about 300 volumes of alkylate per volume of catalyst. The heavy alkylate, principally di-isopropylbenzene produced in the alkylation was cracked over this catalyst at 750° F. and 5 pounds gage pressure, and a charge rate of 2 liquid volumes per volume of catalyst per hour. The per pass conversion was about 60 weight per cent of the charge and the principal products were propylene, benzene and cumene.

The accompanying drawing is provided for the purpose of better illustrating a preferred modification of our invention involving the formation of ethylbenzene, which is a desirable hydrocarbon used, for example, in the manufacture of styrene by subsequent dehydrogenation. The drawing represents somewhat diagrammatically one preferred arrangement of apparatus which may be used in this process.

In the drawing, a propane-propylene feed is passed via line 10 through tubes in cracking furnace 12 wherein the propane and propylene are cracked at an average pressure of about 27 pounds gage at about 1450° F. for a total time of about 6 seconds to give good yields of ethylene. Effluents pass via line 14 through a tar remover, air-fin cooler, and carbon separator indicated diagrammatically at 16, and then via line 18 into a separation system 20, wherein $C_4$ and heavier hydrocarbons are removed, as by line 22, with lighter gases passing off via line 24. A preferred manner of effecting this separation is by a 3- or 4-stage compression-scrubbing system, such as is known to the art, to remove aromatic oils, followed by a fractionator to separate $C_3$ and lighter overhead from remaining $C_4$ and heavier components.

The products from line 24 are refrigerated in zone 26 to a low temperature, as by propane and ethylene cooling steps and passed via line 28 into system 30 for fractionation into methane and small amounts of lighter gases which pass off via line 32, ethylene which is passed via line 34 to the alkylation step described below, ethane which is removed from the system via line 36, and propane and propylene which are recycled via line 38 to line 10 for further cracking.

Ethylene from line 34 (which may of course be obtained or manufactured in any suitable way which may if desired be different from the cracking method shown) is passed via line 40 into admixture with benzene from line 42, and the resulting mixture passed into preheater 44 wherein it is brought to alkylation temperature. A compression step (not shown) may be used, generally prior to preheater 44, to ensure substantially liquid-phase, or dense-phase, conditions in the alkylation. The benzene to ethylene mol ratio is preferably substantially above one in the alkylation reaction zone. Hot alkylation feed passes from preheater 44 via line 46 and one or more of the valved branches 47, 49, 51, and 53, into one or more of the catalyst chambers 48, 50, 52, and 54 containing alkylation catalyst of the type hereinbefore described. Alkylation effluents pass from the catalyst cases via the corresponding valved lines 56, 58, 60, and 62 into conduit 64 and thence to accumulator 66, wherein small amounts of gas separate and are passed via line 68 back to separation system 20 in the ethylene manufacture plant (connection not shown for simplicity in drawing). Liquid from 66 is passed via line 70 into fractionator 72, from which substantially pure benzene is separated overhead and recycled via line 74 to junction with fresh benzene entering via line 76 and thence into line 42 to be passed to the alkylation reaction. Material heavier than benzene is passed from fractionator 72 via line 78 to fractionator 80. Ethylbenzene is separated therefrom in line 82 as a product of the process. Small amounts of heavy refractory material are removed from the system via line 84.

Polyalkylbenzenes are recovered from fractionator 80 and passed via line 86 to preheater 88 wherein they are heated to cracking temperature. The thus-heated polyalkyl benzenes pass via line 90 and one or more of the valved branches 92, 94, 96, 98, into one or more of the catalyst chambers 48, 50, 52, and 54 containing catalyst which has become deactivated in carrying out the alkylation process. The cracked products comprising ethylene, benzene, ethylbenzene, and unconverted heavy alkylate then pass into conduit 100 via one or more of the valved lines 102, 104, 106, and 108, and then into accumulator 110, usually after a water quench. The vapor phase is passed from unit 110 via line 112 back to line 40 so that the ethylene is again used in the alkylation step, while the liquid phase is passed from unit 110 via line 114 to admixture with alkylation effluents in line 64 and on into the separation system described above. The use of a common separation system for both alkylation and cracking effluents in the manner described herein is one of the advantageous features of the invention.

While four catalyst chambers have been shown,

We claim:

1. A process for the synthesis of a mono-alkyl benzene which comprises reacting benzene with a low-boiling aliphatic olefin in an alkylation step in the presence of a solid, synthetic silica-alumina, catalyst under alkylating conditions to produce an alkylate which contains a major proportion of mono-alkyl benzene together with poly-alkyl benzenes, fractionating said alkylate to separate mono-alkyl benzene from poly-alkyl benzenes, treating said poly-alkyl benzenes, as the only reactive hydrocarbon material charged, under cracking conditions in the presence of a catalyst consisting of a solid, synthetic silica-alumina, catalyst which has become substantially spent as an aromatic alkylation catalyst during use in the aforementioned alkylation step and which is used as a catalyst for said cracking without any intermediate treatment, to convert poly-alkyl benzenes to mono-alkyl benzene and low-boiling olefines, and separating mono-alkyl benzene from the cracked products.

2. A process for the synthesis of ethylbenzene which comprises reacting benzene with ethylene in the presence of a solid adsorbent alkylation catalyst, comprising essentially a synthetic silica gel material activated with a minor proportion of alumina under alkylating conditions to produce an alkylate which contains a major proportion of ethyl-benzene together with poly-ethyl benzenes, fractionating said alkylate to separate ethylbenzene from poly-ethyl benzenes, treating said polyethyl benzenes, as the only reactive hydrocarbon material charged, under cracking conditions over a catalyst consisting of a solid adsorbent catalyst, comprising essentially a synthetic silica gel material activated with a minor proportion of alumina which has previously been used for and has become substantially inactive for said alkylation and which is used as a catalyst for said cracking without any intermediate treatment, to convert poly-ethyl benzenes at least partially to ethylbenzene and ethylene, and separating ethylbenzene from the cracked products.

3. A process as in claim 2 in which products from the cracking step are processed to recover ethylene, which is returned to the alkylation step, and a mixture of benzene, ethylbenzene, and unconverted poly-ethyl benzenes, which mixture is combined with the stream of alkylation products prior to separation into the principal components.

4. A process for producing ethyl benzene from ethylene and benzene, which comprises passing a hydrocarbon mixture comprising ethylene and a molecular excess of benzene through a bed of granular synthetic gel catalyst, comprising essentially silica and aluminum oxide and prepared by contacting an acidic hydrous silica gel with an aqueous solution of a hydrolyzable aluminum salt to adsorb said metal as a hydrous oxide to the extent of about 0.5 to 5 per cent by weight, and subsequently washing and drying the said treated gel, maintaining said hydrocarbon mixture under alkylation conditions while in the presence of said catalyst, removing from effluents of said alkylation ethyl benzene as a product of the process, removing also from said effluents a polyethyl benzene fraction, removing from said alkylation said catalyst when it has become substantially inactive as a catalyst for said alkylation, passing said polyethyl benzene fraction, as the only reactive hydrocarbon material charged, through a bed of said inactive alkylation catalyst as the sole catalytic material employed at a temperature between about 700 and 1100° F. and under a low pressure to form ethylene and ethyl benzene without subjecting said inactive alkylation catalyst to any intermediate treatment, and recovering said ethyl benzene as a further product of the process.

5. The process of claim 4 in which said conversion of polyethyl benzene to ethyl benzene and ethylene is conducted in the presence of steam.

6. A process for producing a monoalkyl benzene, which comprises dehydrogenating a low-boiling paraffin hydrocarbon to produce a low-boiling olefin and lighter gases, passing an effluent of said dehydrogenation containing said products to a first separating means and separating an olefin fraction comprising said olefin from light gases, admixing with said olefin fraction an olefin-containing gaseous material as hereinafter recited and a molecular excess of benzene and subjecting said mixture to the action of a solid alkylation catalyst, comprising essentially silica and an oxide of the group consisting of alumina, gallia, india, thallia, titania, zirconia, and thoria and prepared by contacting an acidic hydrous silica gel with an aqueous solution of a hydrolyzable salt of a metal corresponding to said oxide to absorb said metal as a hydrous oxide to the extent of about 0.5 to 5 per cent by weight, and subsequently washing and drying said treated gel under alkylation conditions to produce a monoalkyl benzene, polyalkyl benzenes being concomitantly produced in minor amounts, passing effluents of said alkylation to a second separating means, separating therefrom at least one polyalkyl benzene, subjecting said polyalkyl benzene, as the only reactive hydrocarbon material charged, to reaction conditions of elevated temperature and low pressure in the presence of a solid catalyst, which has previously been used in said alkylation step and has been transferred directly from said alkylation after it has become substantially inactive for said alkylation, as the sole catalytic material employed to produce a monoalkyl benzene and a low-boiling olefin, separating from effluents of the last said reaction a gaseous material comprising low-boiling olefins so produced and a liquid material comprising normally liquid products so produced, and including a monoalkyl benzene product, passing said gaseous material to the aforesaid alkylation step as additional olefin reactant, passing said liquid material to the aforesaid second separating means, separating also from said second separating means light gases and passing same to said first separating means, and recovering from said second separating means as a product of the process a monoalkyl benzene fraction containing material produced in each said reaction.

7. A process for producing a monoalkyl derivative of an alkylatable aromatic hydrocarbon, which comprises subjecting a hydrocarbon mixture comprising a low-boiling olefin hydrocarbon and a molecular excess of an alkylatable aromatic hydrocarbon under alkylating conditions to the action of a solid synthetic gel catalyst comprising essentially silica and an oxide of the group consisting of alumina, gallia, india, thallia, titania, zirconia, and thoria and prepared by contacting an acidic hydrous silica gel with an aqueous solution of a hydrolyzable salt of a metal corresponding to said oxide to adsorb said metal as a hydrous oxide to the extent of about 0.5 to 5 per cent by weight, and subsequently washing and drying said treated gel, removing from effluents of said alkylation a monoalkyl derivative of said alkylatable hydrocarbon as a product of the process, removing also from said effluents a fraction comprising a polyalkyl derivative of said alkylatable aromatic hydrocarbon, subjecting said polyalkyl derivative fraction, as the only reactive hydrocarbon material charged, to reaction conditions of elevated temperature and low pressure in the presence of a solid catalyst which has previously been used in said alkylation and has been transferred directly from said alkylation after it has become substantially inactive for said alkylation, as the sole catalytic material employed to produce a monoalkyl derivative of said alkylatable aromatic hydrocarbon and a low-boiling olefin and recovering said monoalkyl derivative as a further product of the process.

8. The process of claim 7 in which said low-boiling olefin is ethylene.

9. The process of claim 7 in which said low-boiling olefin is ethylene and said alkylatable aromatic hydrocarbon is benzene.

WALTER A. SCHULZE.
JOSEPH P. LYON, Jr.

REFERENCES CITED

The following references are of record in the file of this patent:

UNITED STATES PATENTS

| Number | Name | Date |
|---|---|---|
| 2,010,948 | Egloff | Aug. 13, 1935 |
| 2,242,960 | Sachanen et al. | May 20, 1941 |
| 2,222,632 | Sachanen et al. | Nov. 26, 1940 |
| 2,115,884 | Schollkopf | May 3, 1938 |
| 1,747,604 | Schollkopf | Feb. 18, 1930 |
| 2,317,803 | Reeves | Apr. 27, 1943 |
| 2,373,062 | Stahly | Apr. 3, 1945 |
| 2,364,762 | Schmerling et al. | Dec. 12, 1944 |
| 2,360,358 | Mattox | Oct. 17, 1944 |